US005776426A

United States Patent [19]

Kidd et al.

[11] Patent Number: 5,776,426
[45] Date of Patent: Jul. 7, 1998

[54] TREATMENT OF SOLID MATERIAL CONTAINING FLUORIDE AND SODIUM INCLUDING MIXING WITH CAUSTIC LIQUOR AND LIME

[75] Inventors: Ian Lewis Kidd; Darren Paul Rodda, both of Thornbury; Grant Ashley Wellwood, Mill Park, all of Australia

[73] Assignee: Comalco Aluminium Limited, Melbourne, Australia

[21] Appl. No.: 734,450

[22] PCT Filed: Jul. 23, 1993

[86] PCT No.: PCT/AU93/00374

§ 371 Date: Mar. 15, 1994

§ 102(e) Date: Mar. 15, 1994

[87] PCT Pub. No.: WO94/02263

PCT Pub. Date: Feb. 3, 1994

Related U.S. Application Data

[63] Continuation of Ser. No. 473,922, Jun. 7, 1995, abandoned, which is a continuation of Ser. No. 204,311, Mar. 15, 1994, abandoned.

[30] Foreign Application Priority Data

Jul. 24, 1992 [AU] Australia ................................. PL3753

[51] Int. Cl.$^6$ .............................. C01F 1/00; B01D 11/00
[52] U.S. Cl. .......................... 423/111; 423/119; 423/131
[58] Field of Search ........................... 423/111, 119, 423/131

[56] References Cited

U.S. PATENT DOCUMENTS

| | | | |
|---|---|---|---|
| 3,106,448 | 10/1963 | Whicher et al. | 423/131 |
| 3,808,322 | 4/1974 | Lam et al. | 423/185 |
| 4,113,831 | 9/1978 | Orth, Jr. et al. | 423/119 |
| 4,113,832 | 9/1978 | Bell et al. | 423/119 |
| 4,113,833 | 9/1978 | Eremin et al. | 423/131 |
| 4,158,701 | 6/1979 | Andersen et al. | 423/119 |
| 4,160,808 | 7/1979 | Andersen et al. | 423/119 |
| 4,160,809 | 7/1979 | Andersen et al. | 423/119 |
| 4,226,632 | 10/1980 | Kapolyi et al. | 106/100 |
| 4,252,777 | 2/1981 | McDowell et al. | 423/111 |
| 4,256,709 | 3/1981 | Sizyakov et al. | 423/119 |
| 4,265,864 | 5/1981 | Sugahara et al. | 423/121 |
| 4,310,501 | 1/1982 | Reh et al. | 423/484 |
| 4,348,366 | 9/1982 | Brown et al. | 423/111 |
| 4,355,017 | 10/1982 | Gamson et al. | 423/484 |
| 4,397,822 | 8/1983 | Murtha | 423/111 |
| 4,444,740 | 4/1984 | Snodgrass et al. | 423/119 |
| 4,462,976 | 7/1984 | Karger | 423/481 |
| 4,576,651 | 3/1986 | Deutschman | 134/25.1 |
| 4,597,953 | 7/1986 | Bush | 423/132 |
| 4,698,139 | 10/1987 | Fugleberg et al. | 204/112 |
| 4,735,784 | 4/1988 | Davis et al. | 423/111 |
| 4,762,590 | 8/1988 | Engdahl | 162/30.11 |
| 4,816,122 | 3/1989 | Lever | 423/119 |
| 4,889,695 | 12/1989 | Bush | 423/132 |
| 4,900,535 | 2/1990 | Goodes et al. | 423/484 |
| 4,927,459 | 5/1990 | Gardner et al. | 75/685 |
| 4,956,158 | 9/1990 | Nguyen et al. | 423/111 |
| 4,973,464 | 11/1990 | Richman | 423/119 |
| 5,024,822 | 6/1991 | Hittner et al. | 423/111 |
| 5,112,499 | 5/1992 | Murray et al. | 210/713 |
| 5,164,174 | 11/1992 | Banker et al. | 423/659 |
| 5,211,922 | 5/1993 | Yerushalmi et al. | 423/131 |

FOREIGN PATENT DOCUMENTS

| | | | |
|---|---|---|---|
| 23744/84 | 5/1988 | Australia . | |
| 75394/91 | 11/1991 | Australia . | |
| 87850/91 | 5/1992 | Australia . | |
| 2 056 425 | 3/1981 | United Kingdom . | |
| 2056425 | 3/1981 | United Kingdom | 423/111 |

OTHER PUBLICATIONS

Journal of Metals, "Spent Potlining Symposium", Lee C. Blayden et al. pp. 22–32. J. of Metals, Jul., 1984.
Light Metals—1988, "Treatment of Spent Cathode Waste by Pyrosulpholysis", pp. 917–924. Jan. 25–28, 1988, by C. G. Goodes, et al.
Declaration by Dr. McGeer, Feb., 1996.
Declaration by Dr. Ian Ross, Jan., 1996.
International Appln. No. PCT/AU92/00004 filed Jan. 6, 1992.
International Appln. No. PCT/AU92/00244 filed May 29, 1992.

*Primary Examiner*—Steven Bos
*Attorney, Agent, or Firm*—Nikaido Marmelstein Murray & Oram, LLP

[57] ABSTRACT

A process for treatment of a solid material containing fluoride and sodium, such as spent potlining from aluminum reduction cells, comprising the following steps: 1) contacting the solid material with recycled caustic liquor and source of calcium in a digestor; 2) passing the mixture to a separating device to separate into liquid and solid fraction; 3) recycling part of the liquid fraction containing caustic concentration of 75–200 g/l. calculated as $Na_2CO_3$ to step (1); and 4) recovering concentrated caustic liquor from liquid fraction. The product of the process is a solid residue having low levels of leachable fluoride and a concentrated caustic liquor.

18 Claims, 4 Drawing Sheets

TREATMENT OF SOLID MATERIAL CONTAINING FLUORIDE AND SODIUM INCLUDING MIXING WITH CAUSTIC LIQUOR AND LIME

This application is a continuation of application Ser. No. 08/473,922 filed Jun. 7,1995, now abandoned, which is a continuation of application Ser. No. 08/204,311 filed Mar. 15,1994, now abandoned.

The present invention relates to a process for treating solid material containing fluoride and sodium. The invention is especially suitable for the treatment of spent potlining from aluminium smelting.

Aluminium is conventionally produced by the reduction of alumina. The reduction is carried out in a reduction pot containing fused cryolite. The reduction pot is lined on its side and bottom with a carbonaceous lining. During operation of the pot, the lining gradually deteriorates with the carbonaceous material being penetrated by materials in the pot. The lining eventually deteriorates to such an extent that the pot must be shut-down, the contaminated lining removed and the pot re-lined. The potlining also consists of an outer refractory wall which is removed with the carbonaceous material.

Spent potlinings, as a result of their use, deterioration and penetration by bath materials, contain significant quantities of fluorides, as well as aluminium, alkali metals, nitrides and cyanide. Large quantities of spent potlining are generated each year, with approximately 35,000 tonnes per annum being generated in Australia alone. Disposal of spent potlining, which contains significant quantities of hazardous and/or water leachable material, presents numerous problems.

A number of methods for treating spent potlinings have been previously described. These methods include combustion of the spent potlining, roasting of spent potlining and various treatments with acidic solutions, dilute caustic solutions or with lime.

One such prior art treatment is disclosed in British Patent application No. 2,056,425 by Alcan Research & Development Limited, published 18th March 1981.

The process described in GB 2,056,425 involves treating raw spent pot lining material with lime and caustic soda in such a way as to separate the solid coarse residue from the fine, insoluble $CaF_2$ resulting from lime digestion. According to the application, sodium values from the wastes are converted to sodium hydroxide, some of which react with caustic-soluble alumina in the waste to form sodium aluminate. The resultant caustic/sodium aluminate liquor is stated as being able to be employed in any manner known in the art.

The process of GB 2,056,425 is based on the observation that the particle size of the calcium fluoride deposited in the lime digestion stage is very fine and that if the spent potlining material is ground rather coarsely, the insoluble residues of the spent potlining material may be separated from the calcium fluoride by a screening procedure. This allows for the recovery of a calcium fluoride product and a solids residue. The calcium fluoride may then be treated to recover fluoride values as $AlF_3$ or mixed with sand and subjected to hydrolysis at 1000° C. to recover the fluorine values and leave an inert, residue suitable for landfill.

GB 2,056,425 requires a residence time in the digestion step of 3–4 hours in order to obtain satisfactory extraction of fluorides from the spent potlining. The weight of lime used is preferably 1.2 to 1.6 times the fluoride content of the spent potlining, which is equivalent to a Ca:F molar ratio of 0.4 to 0.6.

Although the process of GB 2,056,425 is described as a lime digestion process, at page 3, the specification states that caustic solution is recycled from a later stage of the process to the digestion step in order to maintain a slurry having a solids content of 15–30%. This caustic soda solution recirculated to the leaching step has a caustic concentration of about 50 g/l caustic soda, calculated as $Na_2CO_3$. In some instances, the recycled caustic liquor may have a caustic concentration of up to 100 g/l, but lower quality products are obtained.

A part of the caustic liquor is also bled out of the system. This liquor contains NaOH, $Al_2O_3$ and F in solution, as well as appreciable quantities of dissolved cyanide. Indeed, the cyanide concentration may be up to 200 ppm. This level of cyanide would cause the recovered caustic soda liquor to be classified as a hazardous waste, which would require careful handling and further treatment to remove the cyanide. One possible method of treatment of the liquor is to return it to a Bayer process alumina plant. However, this option is only available at sites that include a Bayer plant and careful monitoring of any storage and transport facilities used to return the cyanide-containing caustic liquor to a Bayer plant would be required. Furthermore, the caustic liquor has a relatively low caustic concentration and it is likely that concentration of the liquor, e.g. by evaporation, would be required before it could be used in a Bayer plant.

Another option for use of the cyanide-containing caustic liquor is in the production of Dawsonite, $NaAl(OH)_2CO_3$, by reaction with aluminium containing dross. This process requires that the cyanide be chemically removed by precipitation with $CuSO_4\text{-}5H_2O$ or $FeCl_3$, followed by gassing with $Cl_2$, and a chlorine plant would obviously be required for this step.

GB 2,056,425 is specific to the treatment of raw spent potlining and produces, as one product, a dilute caustic soda liquor having a high cyanide level.

To the best knowledge of the applicants, the process described in GB 2,056,425 has never been worked commercially.

Australian Patent No. 573,560, also in the name of Alcan International Ltd, describes two processes for the treatment of cryolite containing spent potlining. In the first process, the spent potlining is contacted with aqueous caustic soda solution containing 200–400 g/l caustic to break down the cryolite into sodium fluoride and sodium aluminate. The liquor is separated from the solid and the sodium fluoride is extracted from the solid residue by contacting with water or a dilute aqueous sodium fluoride solution.

In the second process of AU 573,560, the spent potlining is contacted with a dilute caustic soda solution containing 20–70 g/l caustic in order to dissolve the sodium fluoride, separating the solution from the undissolved residue, concentrating the caustic soda solution by evaporation to cause the precipitation of solid sodium fluoride from solution and separating the precipitated sodium fluoride from the caustic soda solution.

Both processes used in AU 573,560 are specific to the treatment of raw spent potlining. Both processes result in the recovery of sodium fluoride. The sodium fluoride may be further treated in an electrodialysis apparatus to produce HF.

U.S. Pat. No. 4,444,740, assigned to Atlantic Richfield Company, describes a process for treating spent potlining which includes incinerating the spent potlining at a temperature of about 650° to 850° C. and leaching the ash residue with water or a dilute caustic solution. The solids are separated from the leachate, and the solids are treated with dilute sulphuric acid to remove the residual fluorides and contacted with a calcium source to produce insoluble calcium fluoride. The leachate is treated with a calcium source to precipitate calcium fluoride, which is contacted with concentrated sulphuric acid to produce hydrogen fluoride gas and a metal sulphate. The HF gas is treated by alumina and the mixture of alumina and collected fluoride values fed to aluminium reduction pots.

The leaching step is carried out at high lieu d to solids ratios, in excess of 6:1, preferably from 8:1 to 15:1. The leaching step uses either water or a dilute caustic liquor containing about 2%, caustic. A product caustic solution is obtained from the process, but it has to be concentrated from 2% to 36% NaOH by evaporation in order to obtain a useable product.

The only process of which the applicants are aware that has been commercially worked is the Reynold's process. This process involves adding large quantities of an anti-agglomerating agent and lime to the spent potlining. The resulting mixture is then heated to remove cyanide and other volatile material. The material is suitable for disposal in a landfill. This process requires the anti-agglomerating agent and lime to be added in an amount of 2 parts by weight to each 1 part spent potlining. Accordingly, for every tonne of spent potlining treated by the process, 3 tonnes of material has to be dumped as landfill.

Thus, there remains a need for the development of a process for the treatment of spent potlining and other solid material that contains fluoride and sodium which will ameliorate at least some of the problems associated with known treatment processes.

As used hereinafter, the term "solid material containing fluoride and sodium" is to be taken to include a large number of solid materials that contain fluoride and sodium values, including calcined spent potlining from aluminium reduction cells, carbon dust collected from aluminium smelters, spent bath materials from aluminium reduction cells, cryolite and aluminium dross.

According to a first aspect, the present invention provides a process for the treatment of a solid material containing fluoride and sodium, which process comprises:

i) mixing said solid material with a caustic liquor and a source of calcium;

ii) separating the mixture into a liquid fraction and solids fraction;

iii) recycling part of the liquid fraction to step (i); and iv) recovering a caustic liquor from the liquid fraction, wherein the liquid fraction recycled to step (i) has a caustic concentration in the range of 75–200 g/l, calculated as $Na_2CO_3$.

Preferably, the solid material is calcined spent pot lining and the caustic liquor recovered from the liquid fraction is substantially free of cyanide values.

Hereinafter, all references in this specification to caustic concentration are to be understood to be references to caustic concentrations calculated as $Na_2CO_3$.

The liquid fraction recycled back to step (i) may optionally be mixed with water or a more dilute caustic liquor in order to obtain the desired caustic concentration in the recycle stream.

In a preferred embodiment, the solids fraction produced in step (ii) is washed to produce a wash liquor and the wash liquor is at least partly recycled to step (I).

The process of the present invention is particularly suitable for the treatment of calcined spent potlining and for convenience the invention will be described hereinafter with reference to the treatment of calcined spent potlining.

The liquid fraction recycled to the digestion step (step (i)) of the present invention comprises a caustic solution having a caustic concentration of 75–200 g/l. Use of a caustic recycle having the stated caustic concentration allows the recovery of a concentrated caustic liquor as a product of the process. This product caustic liquor is generally of sufficient concentration to be sold as a useful product without further treatment. The product caustic liquor preferably has a caustic concentration of from 180 to 300 g/l caustic (calculated as $Na_2CO_3$), with a caustic concentration in the range of 200–270 g/l (calculated as $Na_2CO_3$) being particularly preferred.

Furthermore, the recovered caustic liquor is substantially free of cyanide values, which means that further processing to remove cyanide is not required and that special precautions to prevent cyanide leakage are not required. The product caustic liquor preferably has a low concentration of fluoride, with fluoride concentration in the product caustic liquor generally being less than 3 g/l.

The concentration of the recycled caustic liquor is preferably in the range of from 75 to 200 g/l (calculated as $Na_2CO_3$), with a concentration of 100–160 g/l being especially preferred The part of the liquid fraction to be recycled to the digestion step may be mixer with suitable quantities of water or wash liquor in order to obtain the desired recycled caustic liquor concentration. It is to be understood that this includes the case where the wash liquor is to be recycled to the digestion step, and part of the product caustic liquor is added to the wash liquor in order to achieve the desired caustic recycle concentration. The wash liquor and part of the product liquor may be mixed together prior to being fed into the digestion vessel or the two streams may be added separately to the digestion vessel and mixed therein.

The calcium source added to the digestion step may be any suitable calcium-containing material. Quicklime and hydrated lime are two examples of suitable materials. Quicklime is the preferred calcium source, as it is a generally economic material to obtain. Furthermore, quicklime reacts in an exothermic manner in the digestion step, producing a large heat of reaction which reduces heating costs.

The calcium source is preferably present in step (i) of the process of the invention such that the molar ratio of Ca to F is in the range of from 0.8 to 2.0, with a Ca:F molar ratio of from 1.0 to 1.5 being particularly preferred. Use of such ratios of Ca to F results in the product caustic liquor of the process having the preferred fluoride content of less than 3.0 g/l.

Step (i) of the process of the invention is preferably operated with a liquor to calcined spent potlining mass ratio in the range of 1.0–3.0, more preferably 1.5–2.0. Generally, lower ratios of liquor to calcined spent potlining are preferred as this reduces the amount of material that has to be heated to the digestion temperature. However, at mass ratios below 1.5, a "sludge" forms that is difficult to agitate or pump.

The temperature of the digestion step is not especially critical, although it is desirable to operate at as low a temperature as possible in order to minimise heating costs. It has been found that temperatures of about 80° C. allow high extraction during the digestion step. Increasing the temperature above 80° C., for example, up to 95° C., has little effect on the digestion step. Although the process will operate at temperatures below 80° C., such temperatures are undesirable as fluoride extraction efficiency is decreased.

Residence times also have little effect on the digestion and again economics dictate that the shortest time compatible with giving good extraction should be used. It has been found that residence times as short as 30 minutes produce acceptable products from digestion, and residence times of this order are preferred. In general, residence times may range from down to at least 20 minutes to 2 hours.

The solid product produced by the process has been found to have a level of leachable F sufficiently low to allow disposal as a landfill. Alternative uses for this solid product are also possible, such as a feed to a cement kiln. It may also be possible to upgrade this material to produce metallurgical or acid grade calcium fluoride, although there are currently no techniques known to the applicant that are capable of achieving such upgrading.

A consideration of the above shows that, in a most preferred embodiment, the present invention provides a process for the treatment of calcined spent potlining, which process comprises:

i) mixing said calcined spent potlining with a calcium source and a caustic liquor to produce a mixture, said mixture having a Ca:F molar ratio in the range of from 1.0 to 1.5 and a liquor to calcined spent potlining mass ratio of 1.5–2.0;

ii) separating the mixtures into a liquid fraction and a solids fraction;

iii) recycling part of the liquid fraction to step (i); and iv) recovering a caustic liquor having a caustic concentration of 180–300 g/l (calculated as $Na_2CO_3$) from the liquid fraction, which caustic liquor is substantially free of cyanide, wherein the liquid fraction recycled to step (i) has a caustic concentration of 75–200 g/l.

In a most preferred embodiment, the solids fraction is washed to remove further caustic therefrom and the resulting wash liquor mixed with part of the product caustic liquor to produce a recycle caustic liquor having a caustic concentration of 75–200 g/l.

It will be appreciated that in cases where the wash liquor and part of the product caustic liquor are not mixed prior to recycle to the digestion vessel but rather are fed separately to the digestion vessel, the effective caustic concentration of the recycle is determined from mass flow rates and caustic concentrations of the streams.

The spent potlining may be calcined by any suitable calcination method prior to being fed to the process of the present invention.

A number of different calciners may be suitable for the calcination of the spent potlining, including:

1) rotary kiln
2) circulating fluidised bed
3) fluidised bed
4) multiple hearth incinerator
5) moving grate furnace
6) open hearth furnace
7) Torbed calciner Of the above, Torbed calciners are the preferred apparatus for calcination of the spent potlining because they provide a calcined product having altered porosity and hence better accessibility to fluoride values for the subsequent digestion step.

The calcination step is preferably carried out at a temperature in the range of 600° C. to 875° C. for the following reasons:

Below 600° C., unacceptably low rates of carbon combustion are experienced.

Above 875° C., agglomeration of the spent potlining may occur, due to the presence of low melting point salts in the spent potlining.

However, in some instances, calcination in a Torbed reactor may take place at temperatures as low as 500° C. whilst still producing calcined spent potlining having acceptable properties. Calcination at such a low temperature has apparent implications for the economy or the calcination step.

In situations where the solid material to be treated by the process of the present invention also contains aluminium, as is the case where the solid material is calcined spent potlining, it may be preferable to treat the solid material prior to the leaching step (i) to at least partially reduce the amount of aluminium contained therein. It will be appreciated that, in leaching step (i), both aluminium and fluoride values are extracted into solution and react with the calcium source (e.g. lime) to form insoluble precipitates. Precipitation of calcium - aluminium containing species increases the amount of lime required in step (i) and accordingly removal of aluminium values from the solid material prior to leaching step (i) can reduce lime consumption.

In one embodiment, aluminium values are removed from the solid material by contacting the solid material with a very concentrated caustic liquor, for example, containing at least 250 g/l caustic, preferably 250–400 g/l. At such high caustic concentrations, extraction of fluoride values into the liquor is suppressed, whilst aluminium values are solubilised. Separation of the solids from the liquid leads to a solid material having a reduced amount of aluminium values contained therein. This solid material may subsequently be passed to step (i) of the present process.

The products of the preferred process of the present invention are a substantially cyanide-free caustic liquor having a caustic concentration sufficiently high to be useful for many applications without needing to undergo evaporation and a calcium fluoride-containing solid product that may be a useful component for addition to cement kilns or may be disposed of as landfill. The process requires only calcined spent potlining and lime (or another source of calcium) as feed components during operation, together with make-up water and/or wash water. Some caustic liquor may be required at start-up.

Compared with the prior art processes known to the applicant, the preferred process of the present invention has a number of advantages. Unlike the process of GB 2,056,425, a cyanide-free caustic liquor that requires no further treatment is obtained. The process of GB 2,056,425 digests raw spent potlining and this causes cyanide and organic components to be extracted into the leach solution. As the leach solution is recycled to the digestion step in GB 2,056,425, the possibility that the concentration of extracted cyanide and organics in the leach solution could build up over time is very real. Indeed, it is possible that the concentration of cyanide and organics in the leach solution of GB 2,056,425 could eventually reach a level sufficiently high for the components to be in an equilibrium concentration with the cyanide and organics in the raw spent potlining. This could lead to no extraction of cyanide and organics from the raw spent potlining, with the result that the solid product of the process still contains these hazardous components. This is clearly an undesirable situation. By treating calcined spent potlining, this situation can not occur in the process of the present invention.

GB 2,056,425 also requires residence times during digestion of 3–4 hours, compared to residence times of down to 30 minutes that may be used in the present invention. It is also a surprising result that leaching of the solid material at caustic concentrations as high as those used in the present invention is able to produce a solid residue having environmentally acceptable levels of leachable fluorides. It is generally understood that the solubility of fluorides in caustic solutions decreases as the caustic concentration increases. Indeed, GB 2,056,425, at the top of page 6, states that using a higher caustic soda content (e.g. 100 g/l $Na_2CO_3$) results in a product with higher levels of F and Na, but that this product may be suitable for use in cathode blocks. The finding by the present applicants that using even higher levels of caustic content can produce a product having low levels of leachable F was unexpected and distinguishes the present invention from prior art processes even in cases where raw spent potlining is treated by the process of the present invention.

In this regard, it is further noted that Canadian Patent Application No. 2048520 by S. Wilkening, on page 3, states that various methods for working up spent pot lining to recover the fluorine content have been proposed. These methods include leaching with a sodium hydroxide solution. However, it is stated that essentially only the consumed carbon material from the cathode section can be recovered economically by this method. Moreover, the fluorine content is leached out only very incompletely; namely, only up to the extent of 60 to 80%. A sludge-like, carbon-containing leaching residue, which is difficult to dispose of, remains behind. This specification clearly shows the difficulties involved in caustic leaching that have been substantially overcome by the present invention.

Finally, tests by the present applicants have shown that conducting the process of the present invention leads to a statistically significant increase in the quality of caustic liquor produced, when compared to use of raw spent potlining in the process. Again, this is a surprising result.

AU 573,560 clearly teaches that a solution of sodium fluoride is recovered from the processes described therein. Recovery of a sodium fluoride solution is essential for the operation of the electrodialysis process used in AU 573,560. In light of this, it is considered that AU 573,560 actually teaches away from adding a calcium source to precipitate $CaF_2$.

BRIEF DESCRIPTION OF THE DRAWINGS

Preferred embodiments of the invention will now be described with reference to the Figures in which.

The present invention is based upon the need to develop a relatively simple and economic process for treating spent potlining to produce products that do not necessarily require further upgrading for disposal and/or further use.

Figure 1:
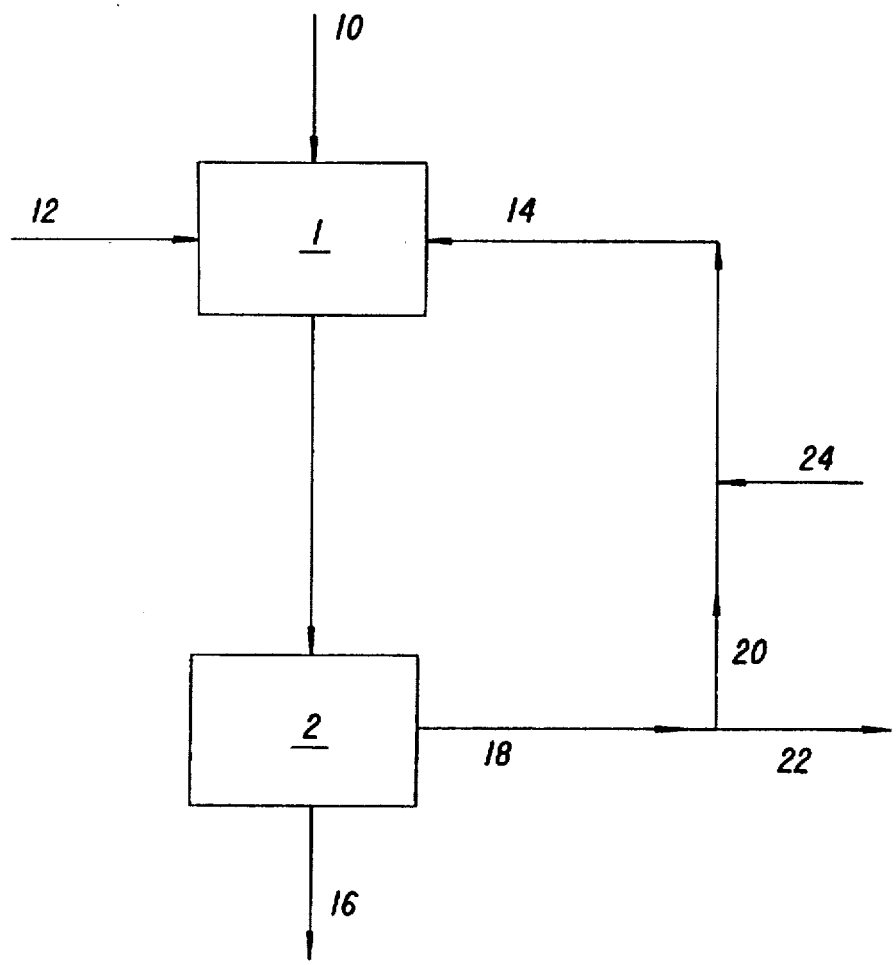
FIG. 1 shows a flow sheet of the process of the invention.

Referring to FIG. 1, the process of the invention comprises feeding calcined spent potlining (10), quicklime 12 and recycled caustic liquor 14 to digester (1). The digester may comprise any suitable solids/liquid contacting device, such as a stirred tank reactor. The digester is operated at 80° C. and a residence time of 30 minutes is used. The solids/liquid slurry from digester (1) is passed to liquid/solids separation stage (2) which, in this case, is a rotary vacuum drum filter or a pressure filter, where the slurry is separated into solids product 16 and liquid fraction 18. The design of the solids/liquid separation stage is not crucial to the invention and any suitable solids/liquid separation device may be used. Examples include clarifiers, rotary vacuum drum filters and belt filters. Other solids/liquid separation devices may also be used.

Liquid stream 18, comprising a concentrated caustic liquor, is separated into recycle stream 20 and product stream 22. Water 24 is optionally added to recycle stream 20 to produce recycled caustic liquor 14.

Figure 2:
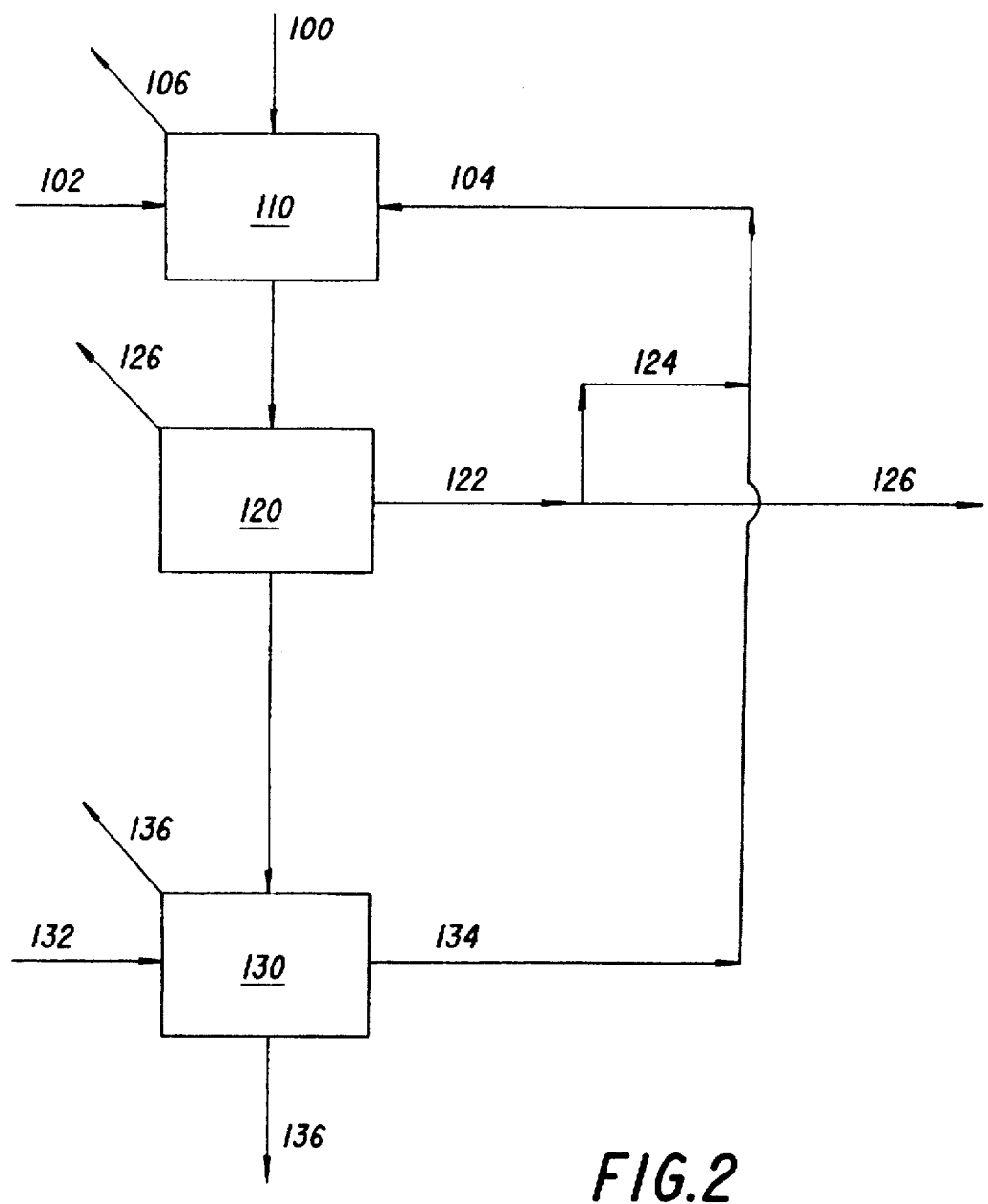
FIG. 2 is a flow sheet of the invention showing further embodiment of the process of the invention.

FIG. 2 shows an alternative flow sheet for the process of the invention. In a flow sheet of FIG. 2, calcined spent potlining (100), lime (102) and recycled feed liquor (104) is fed to digester (110). As the digestion step is operated at elevated temperature (e.g. 80° C.) some evaporation of water will occur, which is shown at (106). The slurry from the digestion step is filtered in filter unit (120) to produce liquid stream (122). The solids recovered from filter unit (120) is passed to second filter unit (130) where it is washed with wash water (132) to remove further caustic. Initial filtration and washing may also be done using separate stages on one filter unit, where appropriate. Wash liquor (134) leaves second filter unit and it is mixed with part (124) of liquid stream (122) to form recycled liquor stream (104). The part (126) of liquor stream (122) not mixed with the wash liquor forms caustic product stream. Solid product (136) from the second filter unit is able to be used for a variety of end uses or it may be disposed of as landfill.

In the embodiment of FIG. 2, the solids from filter unit (120) may be repulped prior to further filtration. In this case, the repulping water forms the wash liquid stream. In FIG. 2, evaporation from units 120,130 is shown as streams 126,136 respectively.

The process as shown in FIGS. 1 and 2 may have several modifications made thereto For example, the calcined spent potlining may be beneficiated prior to the digestion step to produce a fluoride-rich fraction and a carbon-rich fraction, with the fluoride-rich fraction subsequently passing to the digestion step.

The solids product produced by the process may be dumped in a landfill, sold to an end-user or further beneficiated to upgrade the calcium fluoride therein to metallurgical or acid grade. Some processing options are shown in FIG. 3.

Figure 3:
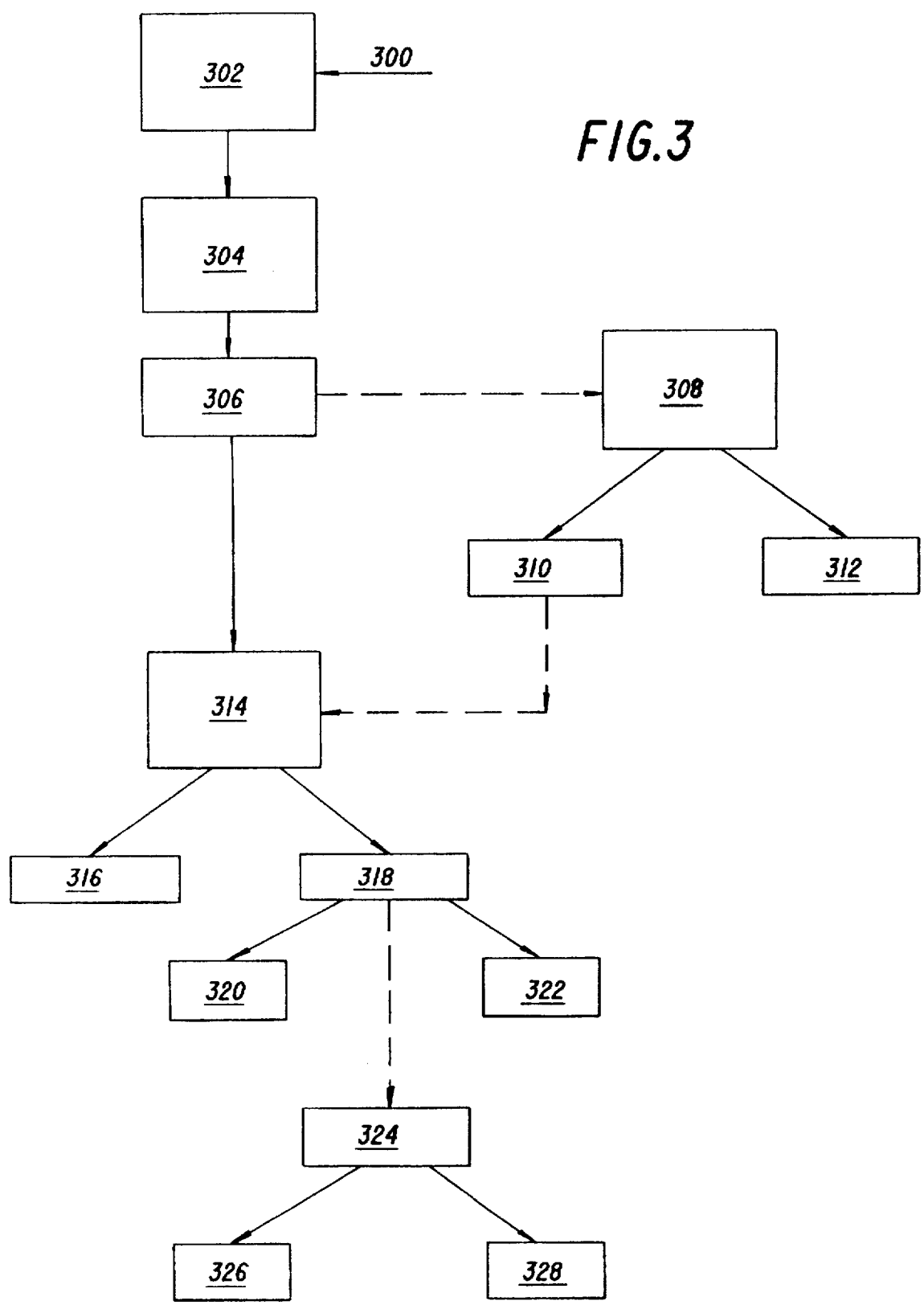
FIG. 3 is an expanded flow sheet of the process showing various solids processing options.

As shown in FIG. 3, raw spent potlining (300) is comminuted (302) to a desired particle size and calcined (304), for example, in a Torbed reactor at a temperature of 500°–875° C. The ash (306) recovered from the calcination step may be passed to beneficiation step (308), which produces a fluoride-rich stream (310) and a carbon rich stream (312). The carbon rich stream (132) may be used for any suitable end-use, such as a feed stock for a cement kiln. The fluoride-rich fraction (310) is then passed to a caustic-lime treatment (314) in accordance with the present invention. Alternatively, the spent pot lining ash (306) may be directly passed to caustic/lime treatment (314).

The products of caustic/lime treatment (314) include caustic liquor (316) that is substantially free of cyanide. This caustic liquor is a concentrated liquor and it may be used in any suitable application, such as returned to an alumina plant. Solid product (318) from caustic/lime treatment (314) may be fed to a cement kiln (320) or disposed of as land fill (322). A further possibility is that solid (318) may be beneficiated (324) to produce an up-graded $CaF_2$ (326) and inerts (328) although the applicants do not know of any techniques to achieve such upgrading. The inerts (328) may be disposed of as landfill or subjected to any other suitable use.

Figure 4:
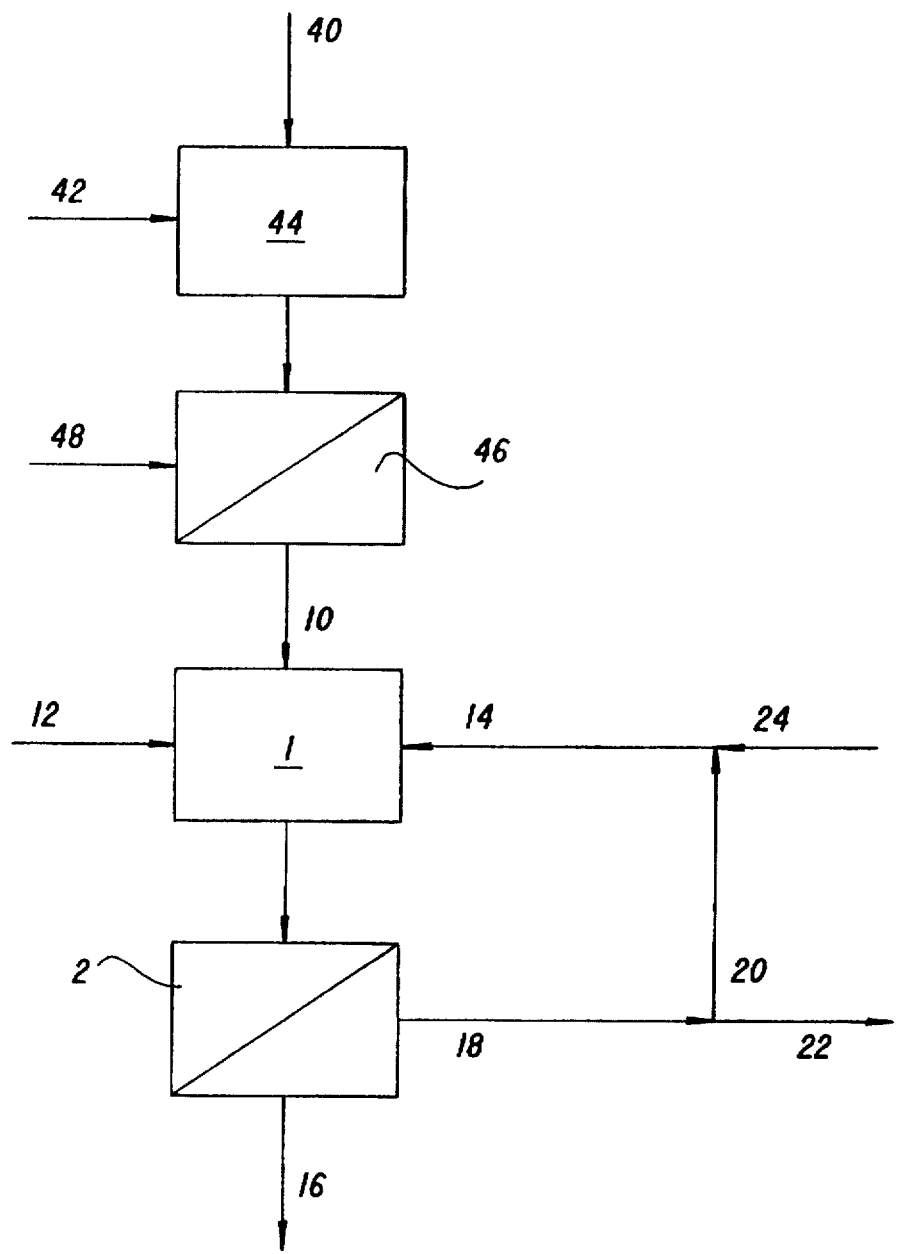
FIG. 4 shows a further embodiment of the invention which includes a pre-treatment step for removing some of the aluminium values from the calcined spent potlining prior to digestion.

Referring to FIG. 4, the flow sheet of FIG. 1 has been modified to include a pre-treatment step to remove aluminium from the calcined spent potlining. In this process, calcined spent potlining (40) is mixed with a very concentrated caustic solution (42), for example, having 250–400 g/l caustic, in vessel (44). Concentrated caustic solution (42) may be obtained from any suitable source and is preferably obtained by concentration of part of recovered caustic liquor (48) by, for example, evaporation of water therefrom or by the addition of fresh caustic (e.g. solid pellets) as top-up. At such high caustic concentrations, aluminium values are extracted from the calcined spent potlining and the solubility of fluorides is suppressed. The solids and liquor from vessel (44) are separated in solid-liquid separation vessel (46), which may be a filter unit or any other suitable solid-liquid separation unit. Liquor (48) is recovered for further use, such as return to a Bayer plant. Solids (10) are then sent to a treatment process that, as shown in FIG. 4, is essentially identical to the process of FIG. 1. However, as the aluminium values present in solids (10) have been substantially reduced by the treatment steps in vessels (44) and (46), lime consumption in digestion vessel (1) may be significantly reduced Examples A series of experimental runs were carried out in order to simulate the process of the present invention. These experiments simulated the flow sheet as shown in FIG. 1.

The process of FIG. 1 was operated under the conditions shown in Table 1:

TABLE 1

| DIGESTION CONDITIONS | |
| --- | --- |
| Feedstock: | calcined spent potlining |
| Particle Size: | –600 μm |
| Residence Time: | 30 min |
| Temperature: | 80° C. |
| Liquor:Calcine Mass Ratio: | 1.5 |
| Ca:F molar ratio: | 1.0 |
| Recirculating liquor: | 150 g/l caustic |
| Calcium Source: | quicklime |

The calcined spent potlining fed to the process had the analysis as given in Table 2:

TABLE 2

| CALCINED SPENT POTLINING ANALYSIS | | | | | | | |
| --- | --- | --- | --- | --- | --- | --- | --- |
| F | Na | Al | Si | Fe | Ca | C | leachable F |
| 16.5 | 12.4 | 27.9 | 4.2 | 1.0 | 1.4 | 14.5 | 690 ppm |

Using the digestion conditions of Table 1, a solids product having a leachable fluoride of 22 ppm was obtained. This level of leachable F is well within the environmental guidelines of the New South Wales EPA, which require a leachable F concentration of less than 150 ppm. The solid product had the following analysis:

TABLE 3

| SOLID PRODUCT ANALYSIS | | | | | | |
| --- | --- | --- | --- | --- | --- | --- |
| F | Al | Fe | Si | Na | Ca | Leachable F |
| 8.2 | 12.0 | 0.3 | 2.6 | 1.8 | 28 | 22 ppm |

The caustic liquor produced had a caustic concentration of 265 g/l $Na_2CO_3$ and a fluoride content of 2.65 g/l. This liquor is suitable for use in a number of processes without further treatment.

In further experiments, the lime requirement was determined by adding the appropriate solids to liquor of 150 g/l caustic concentration. The test parameters used were:

TABLE 4

| OPERATING PARAMETERS | |
| --- | --- |
| Calcine Size | –600 μm |
| Temperature | 80° C. |
| Time | 30 min |
| Ca:F Molar Ratio | 0.6, 1.0, 1.5 |
| Liquor:Calcine Mass Ratio | 1.5 |
| Lime Source | Quicklime |
| Initial Liquor Caustic | 150 g/l |

The effect of Ca : F molar ratio on caustic concentration is negligible between 0.6 and 1.5. However, the liquor fluoride level increases with decreasing lime dosage. The increase is greatest between Ca : F molar ratios of 1.0 and 0.6 (1.95 g/l →3.65 g/l). Increasing the Ca : F molar ratio to 1.5 reduces the fluoride concentration to 1.36 g/l. The final choice of Ca : F molar ratio will depend primarily on the cost of supplying lime to the process and also on the necessity to reduce the liquor fluoride levels. A summary of the liquor properties measured to date is given in Table 5.

TABLE 5

| MEASURED LIQUOR PROPERTIES | | | |
| --- | --- | --- | --- |
| Ca:F molar ratio | Caustic (g/l $Na_2CO_3$) | $Al_2O_3$ (g/l) | F (g/l) |
| 0.6 | 264.4 | 66 | 3.65 |
| 1.0 | 257.3 | 15 | 1.95 |
| 1.5 | 261.0 | 0 | 1.36 |

The high lime dosages have the effect of polishing $Al_2O_3$ from the liquor as well as fluoride.

In order to satisfy existing Australian standards (NSW SPCC) with respect to leachable fluoride contents, a series of standard leach tests were carried out on the residues (Table 6). The fluoride content of the leachate must not exceed 150 ppm (TCLP Method 13XX) for the material to be acceptable as landfill.

TABLE 6

| LEACHABLE FLUORIDE | |
| --- | --- |
| Ca:F molar ratio | leachable Fluoride (ppm) |
| 0.6 | 292 |
| 1.0 | 22 |
| 1.5 | 23 |

Given these results, the residue would be unacceptable as landfill if the Ca : F molar ratio employed was 0.6 but well inside the limit at the higher ratios. Hence, the optimum Ca : F molar ratio is 1.0, subject to 1.95 g/l fluoride in the liquor being acceptable.

In order to further demonstrate the advantages of the present invention, a series of tests were carried out to compare the treatment of calcined spent potlining to raw spent potlining. For each sample, ten batches were prepared for reaction. The conditions employed for the reaction are summarised in Table 7:

TABLE 7

SUMMARY OF REACTION CONDITIONS

| PARAMETER | SPECIFICS |
|---|---|
| Individual Batch Size | 62.5 gm SPL/ASH |
| No. Batches per Population | 10 |
| SPL/Calcine:Lime Mass Ratio | 0.62 |
| Extract Liquor Concentration | 150 g/l (as $Na_2CO_3$) |
| Extract Liquor:SPL/Calcine Mass Ratio | 2:1 |
| Extract Temperature | 80° C. |
| Extract Period | 30 min |
| Filtration Technique | Vacuum Buchner |
| Wash Water Ratio | 81.25 gm |

To minimise variation, each sample population was reacted simultaneously under the same conditions of temperature and time in an agitated water bath unit. Following digestion, the individual bottles were placed in an ice bath to minimise further reaction prior to filtration. The raw liquors and the washed cakes were then analysed.

The two sample populations were then compared against a number of key product quality/performance criteria. A summary of the findings is given in Table 8.

TABLE 8

COMPARISON OF RAW AND CALCINED SPL SAMPLE POPULATIONS AGAINST KEY PERFORMANCE CRITERIA

| PARAMETER | RAW SPL | | CALCINED SPL | | DIFF AT 95% C. |
|---|---|---|---|---|---|
| | AVERAGE | STANDARD DEVIATION | AVERAGE | STANDARD DEVIATION | |
| Liquor - Caustic soda (g/l) | 204.5 | 2.5 | 211.2 | 2.0 | Yes |
| Liquor - Total soda (g/l) | 235.5 | 3.9 | 236.7 | 1.9 | No |
| Liquor - CN (ppm) | 137 | 35 | 2.1 | 1.45 | Yes |
| Liquor - F (ppm) | 3990 | 152 | 3820 | 92 | Yes |
| Solids - Leachable F (ppm) | 463 | 57 | 654 | 97 | Yes |
| Solids - Leachable CN (ppm) | 0.32 | 0.04 | 10.2 | — | Yes |
| Solids - Total Na (%) | 2.75 | 0.10 | 2.63 | 0.12 | Yes |
| Colour | Green | | | Clear | |

The results show that the major benefit of calcination is the absence of significant levels or cyanide in the products. Surprisingly, there is also some improvement in the quality of the caustic liquor.

The present invention provides a relatively simple and economic process for the treatment of spent potlining. Compared to the prior art process known to the applicants, the process produces solid and liquid effluents that are readily disposable and of potentially economic value. The process operates with a high solids density which results in lower pumping and heating costs and also allows for smaller process vessels, thus reducing capital expenditure. The flow sheet of the process is also readily expandable to provide up-grading of the calcined spent potlining feedstock and/or the solid product which provides a degree of flexibility to meet changing demands for the products. Moreover, the present invention provides several unexpected advantages in cases where the solid material is calcined spent pot lining. The claims form part of the disclosure of this specification.

We claim:

1. A process for the treatment of solid material containing fluoride and sodium comprising the steps of:

(i) mixing said solid material with a caustic liquor and lime to form a mixture, having a molar ratio of Ca:F of from 0.8 to 2.0;

(ii) separating the mixture into a liquid fraction and a solids fraction;

(iii) recovering a product caustic liquor from the liquid fraction;

(iv) washing said solids fraction to form a washed solids fraction and a wash liquor;

(v) recycling caustic liquor having a caustic concentration of 75-200 g/l, calculated as $Na_2CO_3$, to step (i), said caustic liquor being selected from the group consisting of a part of the liquid fraction from step (ii); a wash liquor obtained from step (iv); and a mixture of a part of the liquid fraction from step (ii) and a wash liquor obtained from step (iv); and (vi) recovering the washed solids fraction.

2. A process as claimed in claim 1 wherein the solid material is calcined spent potlining and the caustic liquor recovered from the liquid fraction is substantially free of cyanide values.

3. A process as claimed in claim 1 wherein the caustic liquor recovered in step (iii) has a caustic concentration of from 180 to 300 g/l.

4. A process as claimed in claim 3 wherein the caustic concentration of the caustic liquor recovered in step (iii) is from 200 to 270 g/l.

5. A process as claimed in claim 1 wherein the solids fraction from step (ii) is washed to remove caustic therefrom to produce a wash liquor and the wash liquor is at least partially recycled to step (i).

6. A process as claimed in claim 1 wherein the caustic concentration of the caustic liquor recycled to step (i) is in the range from 100 to 160 g/l.

7. A process as claimed in claim 1 wherein the molar ratio of Ca to F is in the range of 1.0 to 1.5.

8. A process as claimed in claim 1 wherein step (i) is operated with a liquor to solids mass ratio in the range of 1.0 to 3.0.

9. A process as claimed in claim 8 wherein the liquor to solids mass ratio is in the range of 1.0 to 1.5.

10. A process as claimed in claim 1 wherein step (i) is conducted at a temperature of 80°-95° C.

11. A process as claimed in claim 1 wherein step (i) is operated with a residence time of at least 30 minutes.

12. A process as claimed in claim 1 wherein the solid material also contains aluminum and at least part of said aluminum is removed from the solid material prior to step (i).

13. A process as claimed in claim 12 wherein the aluminium is at least partly removed by contacting the solid material with a caustic liquor having a caustic concentration of 250–400 g/l, calculated as $Na_2CO_3$, to extract the aluminium into solution while suppressing extraction of fluoride and subsequently separating the solid material from the liquor.

14. A process as claimed in claim 1 in which the solid material includes spent potlining from aluminium reduction cells and said spent potlining is calcined at a temperature of from 500° to 875° C. prior to step (i).

15. A process as claimed in claim 1 wherein said lime is quicklime or hydrated lime.

16. A process as claimed in claim 1 wherein said solids fraction has a leachable fluoride content of less than 22 ppm.

17. A method as claimed in claim 1 wherein the concentration of the caustic liquor recycled to step (i) is in the range of 150–200 g/l, calculated as $Na_2CO_3$.

18. A process as claimed in claim 1 wherein said solids fraction has a leachable fluoride content of less than 150 ppm.

* * * * *